United States Patent [19]

Allard et al.

[11] Patent Number: 5,471,560
[45] Date of Patent: Nov. 28, 1995

[54] METHOD OF CONSTRUCTION OF HIERARCHICALLY ORGANIZED PROCEDURAL NODE INFORMATION STRUCTURE INCLUDING A METHOD FOR EXTRACTING PROCEDURAL KNOWLEDGE FROM AN EXPERT, AND PROCEDURAL NODE INFORMATION STRUCTURE CONSTRUCTED THEREBY

[75] Inventors: James R. Allard, St. Paul; Edward L. Cochran; Alan S. Wolff, both of Minneapolis, all of Minn.

[73] Assignee: Honeywell Inc., Minneapolis, Minn.

[21] Appl. No.: 197,661

[22] Filed: Feb. 17, 1994

Related U.S. Application Data

[63] Continuation of Ser. No. 774,642, Oct. 11, 1991, abandoned, which is a continuation of Ser. No. 338,552, Apr. 11, 1989, abandoned, which is a continuation of Ser. No. 1,949, Jan. 9, 1987, abandoned.

[51] Int. Cl.$^6$ ..................................................... G06F 15/20
[52] U.S. Cl. ................................................. 395/77; 395/50
[58] Field of Search ................................. 395/10, 12, 50, 395/51, 75, 76, 77

[56] References Cited

U.S. PATENT DOCUMENTS

| 4,318,184 | 3/1982 | Millett et al. | 364/900 |
|---|---|---|---|
| 4,613,946 | 9/1986 | Forman | 364/518 |
| 4,658,370 | 4/1987 | Erman et al. | 364/513 |
| 4,752,889 | 6/1988 | Rappaport et al. | 364/188 |
| 4,763,277 | 8/1988 | Ashford et al. | 364/900 |
| 4,816,994 | 3/1989 | Freiling et al. | 364/200 |
| 4,841,441 | 6/1989 | Nixon et al. | 364/513 |
| 4,853,873 | 8/1989 | Tsuji et al. | 364/200 |
| 4,891,766 | 1/1990 | Derr et al. | 364/513 |
| 4,916,633 | 4/1990 | Tychonicuich et al. | 364/513 |
| 4,967,368 | 10/1990 | Bolling et al. | 364/513 |
| 5,065,338 | 11/1991 | Phillips et al. | 395/51 |

OTHER PUBLICATIONS

Musen et al., "Use of a Domain Model to Drive an Interactive Knowledge–Editing Tool", *Int. J. Man–Machine Studies*, (1987) 26, pp. 105–121.
Winston, Patrick H., *Artificial Intelligence*, Addison–Wesley, 1984, Chapters 2, 4 and 6.
Winston, Patrick H., *Artificial Intelligence*, Addison–Wesley, 1984 pp. 87–93.
Butler et al., "Building Knowledge–Based Systems with Procedural Languages", IEEE Expert, Summer 1988, pp. 47–59.
Cooke et al., "A Formal Methodology for Acquiring and Representing Expert Knowledge", Proc. IEEE, vol. 74, No. 10, O '86 pp. 1422–1430.
Patton, "Knowledge Engineering: Tapping the Experts", Electronic Design, May 2, 1985 pp. 93–100.
Kahn et al., "Strategies for Knowledge Acquisition", IEEE Trans. on Patt. Anal. and Mach. Intdl., vol. PAMI-7, No. 5, Sep. 1985, pp. 511–522.

*Primary Examiner*—Rebecca L. Rudolph
*Attorney, Agent, or Firm*—Paul H. McDowall; Michael B. Atlass; Trevor B. Joike

[57] ABSTRACT

A knowledge acquisition tool for direct use by an expert in the automatic creation of a knowledge base derived from the knowledge of the expert, the knowledge acquisition tool including an input device usable by the expert for providing knowledge to the tool in response to questions, statements and/or prompts from the tool, a display for displaying the knowledge, questions, statements and prompts so that the expert can interact with the tool in creating the knowledge base, and a processor connected to the input device and the display for supplying the questions, statements and prompts to the display in order to extract the knowledge from the expert in the creation of the knowledge base incorporating the knowledge provided by the expert through use of the input device.

5 Claims, 5 Drawing Sheets

LEVEL 1　　　LEVEL 2　　　LEVEL 3

METHOD OF CONSTRUCTION OF HIERARCHICALLY ORGANIZED PROCEDURAL NODE INFORMATION STRUCTURE INCLUDING A METHOD FOR EXTRACTING PROCEDURAL KNOWLEDGE FROM AN EXPERT, AND PROCEDURAL NODE INFORMATION STRUCTURE CONSTRUCTED THEREBY

This application is a continuation of application Ser. No. 07/774,642, filed Oct. 11, 1991, now abandoned, which is a continuation of application Ser. No. 07/338,552, filed Apr. 11, 1989, now abandoned, which is a continuation of application Ser. No. 07/001,949, filed Jan. 9, 1987, now abandoned.

BACKGROUND OF THE INVENTION

The present invention relates to a knowledge acquisition tool which automatically interviews an expert and extracts the knowledge of the expert for the creation of a machine-executable knowledge base.

Expert systems are being created today to allow the ordinary technician to operate at the level of an expert. Such expert systems are useful in a wide variety of fields such as medicine, building maintenance, automobile repair and the like. Even though such fields vary widely, expert systems which are useful in these fields have one thing in common, the ability to allow anyone practicing in the field to operate with the efficiency and knowledge of the expert.

An expert system guides the end user, who as mentioned may be an ordinary technician, through a problem solving exercise. The system provides information to the end user permitting the user to make intelligent choices among a number of possible alternative actions and to provide information to the system in order to elaborate those actions. For example, in the automobile repair field, the end user (mechanic) may be asked by the system to first choose among the major components of the automobile (engine, drive train, etc.) on which service is to be conducted. The system then progressively narrows the possible choices in order to focus upon the area to be serviced or the problem to be solved. In this process, the system may ask for input from the end user in order to present to the end user the most probable selection of choices or actions. Thus, the system may ask the mechanic whether the engine has 4, 6 or 8 cylinders, whether each cylinder is getting a spark, what the compression is in each cylinder, etc.

In creating an expert system, a knowledge engineer plays the active role of acquiring domain knowledge from an expert and transferring this knowledge to a knowledge base. The knowledge engineer is the creator of the knowledge base and the domain expert is the expert in the domain of interest whose knowledge is to be extracted and used to create the knowledge base. This knowledge base is then used as the foundation of the expert system to allow the end user to function at the level of the expert. The acquisition of knowledge from an expert by the knowledge engineer and the creation of the knowledge base are time-consuming and difficult tasks.

The present invention facilitates these time-consuming tasks by automating the knowledge acquisition and knowledge base creation functions. Such an automated knowledge acquisition tool has many advantages. For example, the use of automated knowledge extraction provides consistency in the interview techniques. Because knowledge extraction has heretofore been labor-intensive and time consuming, automated knowledge acquisition can be cost effective since it reduces the level of effort needed in the knowledge acquisition and knowledge base creation tasks. An automated knowledge acquisition tool allows the expert to progress at his or her own speed and at times convenient to the expert, unhampered by a knowledge engineer who may be relatively unfamiliar with the field.

SUMMARY OF THE INVENTION

Accordingly, the knowledge acquisition tool of the present invention interviews an expert to automatically create a knowledge base derived from the knowledge of the expert and includes an input device, such as a keyboard and/or mouse, usable by the expert for providing knowledge in response to questions, statements and prompts from the tool, a display such as a CRT screen for displaying the knowledge, questions, statements and prompts so that the expert can interact with the tool in creating the knowledge base, and a processor connected to the input device and the display for supplying the questions, statements and prompts to the display in order to extract the knowledge from the expert in the creation of the knowledge base incorporating the information provided by the expert through use of the input device.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
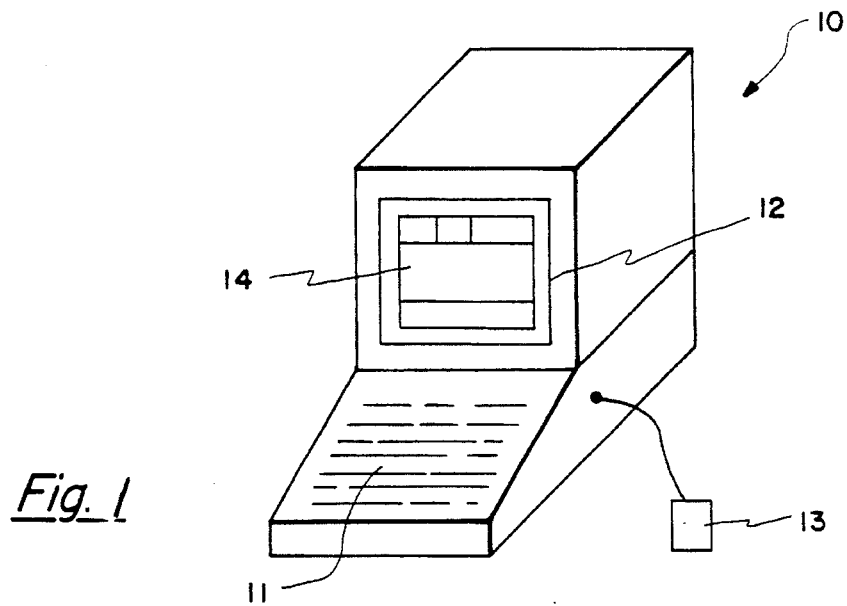
FIG. 1 is an overview of the knowledge acquisition tool according to the present invention.

The knowledge acquisition tool according to the present invention can be implemented by way of a computer such as the computer 10 shown in FIG. 1. Computer 10 has a keyboard 11 for interacting with the inquiries and/or statements displayed on display screen 12 so that the expert, from whom knowledge is to be extracted and used in the creation of the knowledge base, can interact with the tool. Also provided is a mouse 13 which the expert can use to move a cursor in the form of a runner about the display screen 12 and to click onto various menu items shown in the menus which are projected onto display screen 12. The knowledge acquisition tool of the present invention will be referred to hereinbelow and in the attached Appendices variously as KAT, Fat KAT or KLAMSHELL.

KAT frame 14 is shown on display screen 12 in FIG. 1. Frame 14 is used to present the various menus and graphics to the expert user during the process of extracting the expert's knowledge for inclusion into the knowledge base produced by tool 10. The arrangement of this frame 14 will be discussed in more detail hereinbelow.

Figure 2:
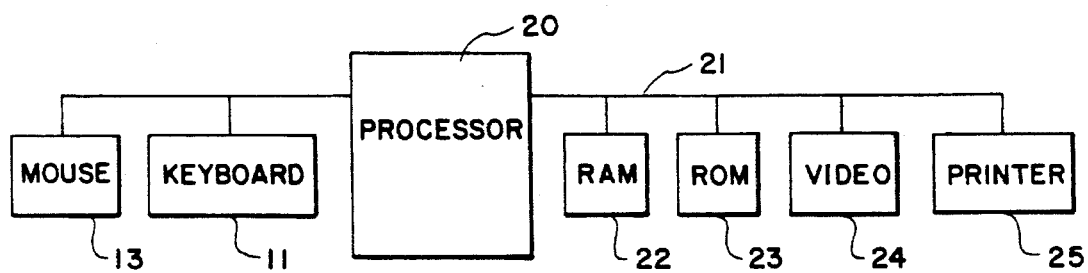
FIG. 2 is a block diagram showing in more detail the knowledge acquisition tool according to the present invention.

The block diagram of the computer shown in FIG. 1 is shown in FIG. 2 and comprises processor 20 connected over bus 21 to random access memory 22, read only memory 23, video controller 24 which controls what is being displayed upon display screen 12, and printer 25 which can make hard and permanent copies of any of the menu or information display items which are displayed upon display screen 12. For providing the interface between the expert and the knowledge acquisition tool are the keyboard 11 and mouse 13 as shown in FIG. 1.

Figure 3:
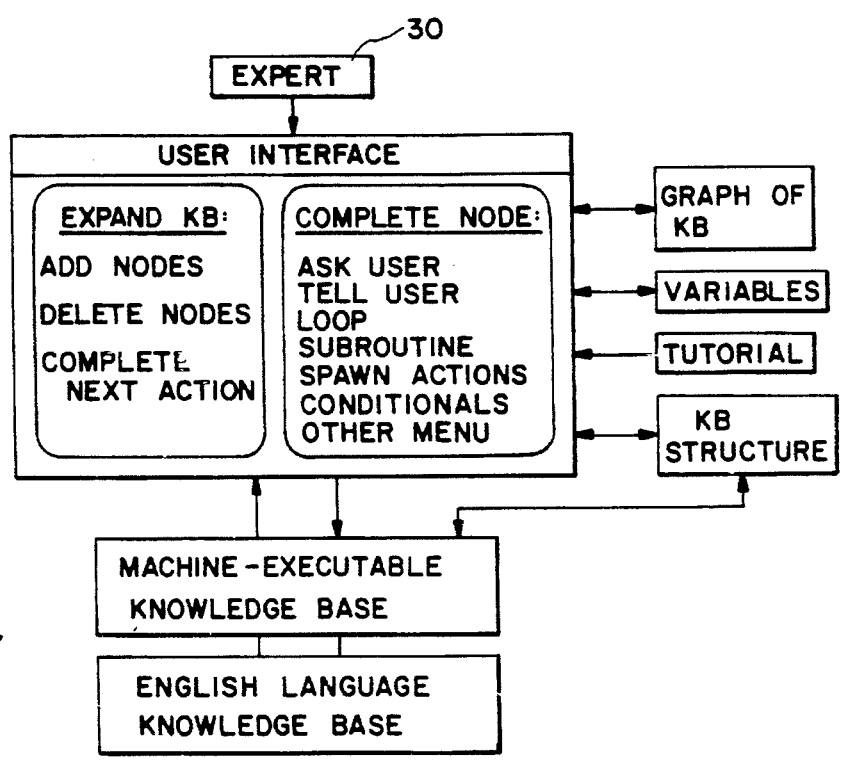
FIG. 3 shows an overview of the features of the knowledge acquisition tool according to the present invention.

FIG. 3 shows an overview of the knowledge acquisition tool system in terms of the manner in which the knowledge acquisition tool 10 interacts with the expert in the extraction of the expert's knowledge for the creation of the knowledge base. The expert, represented by block 30 in FIG. 3, is guided through the creation and editing of the knowledge base in a highly structured manner using primarily a depth first questioning method. That is, the knowledge acquisition tool of the present invention relies upon a direct interview strategy of guiding the expert along hierarchical lines of reasoning. Accordingly, the knowledge acquisition tool interviews in a top-down manner by asking the expert to successively refine his or her knowledge. The expert is first asked to identify high-level procedures, which may be referred to as nodes or actions, and which will later be decomposed into sub-procedures which in turn may be further decomposed into subordinate procedures, and so on. This interview process proceeds in a depth-first manner. That is, from the expert's perspective, an individual line of reasoning is followed to a logical conclusion before other lines are pursued.

Figure 8:
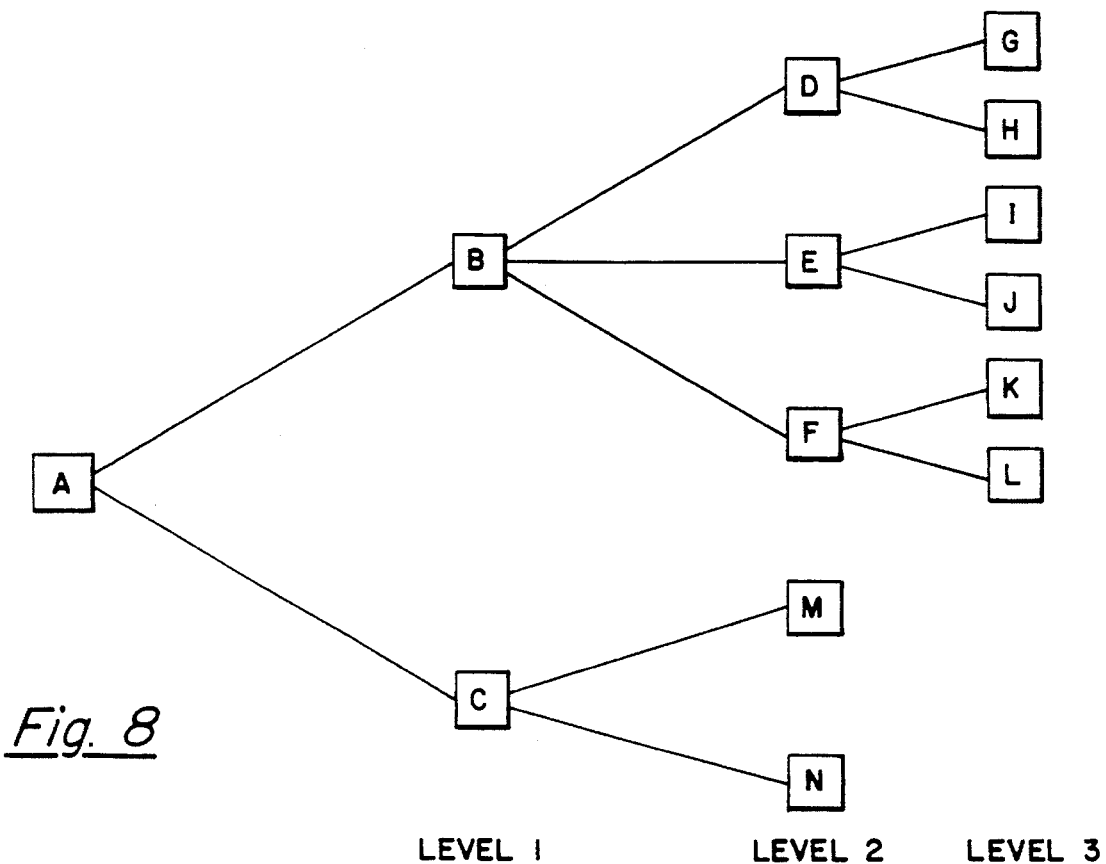

This hierarchical expansion or interviewing process can best be explained by referring to FIG. 8. The process can be referred to as a bottom-most, left-first expansion procedure if the tree is constructed in a vertical manner or as a top-most, right-most procedure if the tree is constructed in a horizontal manner, but both or either is used to define the hierarchical expansion or interviewing process of the present invention. This hierarchical approach requires a line of reasoning to be fully expanded before other lines of reasoning can be expanded. FIG. 8 shows the creation of a horizontal tree although the tree can be constructed in any direction. A distinction is made between the specification of nodes and their later expansion into completed lines of reasoning. Experts first specify a set of goals and subgoals, and begin to complete or expand each bottom-most subgoal only when no further subgoals will be generated along any particular line of reasoning. This method of interviewing leads to two benefits: first, a line of reasoning is always followed to its logical conclusion; second, intermediate goals specified but not yet expanded serve as reminders to the expert of what remains to be completed.

In FIG. 8, the expert may have defined his knowledge base in terms of A. Knowledge base A can be broken down by the expert into two basic parts or actions at level 1. Each part can be further expanded at level 2 and any of these parts may be further expanded at level 3. The hierarchical expansion of actions requires the expert to pursue each line of reasoning completely before the expert pursues other lines of reasoning. As shown in FIG. 8, for example, knowledge base A has subactions or nodes B and C. From B, the expert can specify a plurality of further subactions or nodes such as D, E and F at level 2. From D, in turn, further subactions G and H at level 3 can be specified. The hierarchical procedure of the present invention requires the expert to expand a branch along the tree (such as A-B-D-G) before any other branches (such as A-B-D-H) depending from it are expanded. Thus, after action A is expanded into subactions B and C, the first subaction, B, is expanded into subactions D, E and F the first of which, D, which is in turn expanded into subactions G and H before any other action or subaction can be expanded. Once the branches A-B-D-G and A-B-D-H are fully expanded in that order, and assuming that subactions G and H need no further expansion, then the next unexpanded action at level 2, i.e. action E, can be expanded into its subactions I and J. Action C cannot be expanded until all level 2 actions emanating from action B are expanded. Then action C may be expanded. In the example of FIG. 8, hierarchical expansion of the action tree requires that the branches be expanded in the following order: A-B-D-G; then A-B-D-H; then A-B-E-I; A-B-E-J; A-B-F-K; A-B-F-L; A-C-M; A-C-N.

In order to conduct such an interview, the user interface of the knowledge acquisition tool allows the expert to add or delete nodes (i.e. actions) and complete the next action as shown in FIG. 3. In order to complete the next action, several functions are available to the expert. The expert may create a question (ask user) which solicits information from the end user. In an expert system for the maintenance of building air conditioning equipment, for example, the end user may be asked to provide the temperature of the chilled water. Additionally, the expert may tell the user to perform a particular task or function. Thus, in the chiller maintenance tool of the example, the expert may direct the end user to "check the refrigerant" or "fix the heat controller". The expert may create loops such as requiring the end user to perform a task or a series of tasks a number of times until completion or perform a series of alternative maintenance tasks until a component has been fixed. Subroutines may be created by the expert which can be accessed by the expert system whenever a predetermined set of conditions exist. The expert can spawn actions, i.e. specify a set of new actions. The expert can also establish conditionals such as "only do B if A is true."

The knowledge acquisition tool has several options which will assist the expert in constructing the knowledge base. These options can include an on line Tutorial which allows the expert to learn more about the knowledge acquisition tool without referring to a separate user's manual, lists of Variables for allowing the expert to inspect the names and associated values of variables which he or she has declared in the construction of the knowledge base, the Knowledge Base Structure which presents to the expert a list of all the actions he or she has created in the knowledge base and a graph of the knowledge base, such as that shown in FIG. 8.

Once all of the relevant knowledge has been extracted from the expert, and the knowledge base has been created, the knowledge acquisition tool can write the knowledge base in a machine-executable code for use by an end user. According to the present invention, the knowledge acquisition tool writes the knowledge base in PML which is a knowledge-engineering language developed by Honeywell Inc., although it is designed to be able to write the knowledge base in any language. At the completion of a knowledge acquisition session with the knowledge acquisition tool, the expert is presented with an english language description of the knowledge base which has just been created. This description can be read by an expert who is unfamiliar with programming languages.

Figure 4:
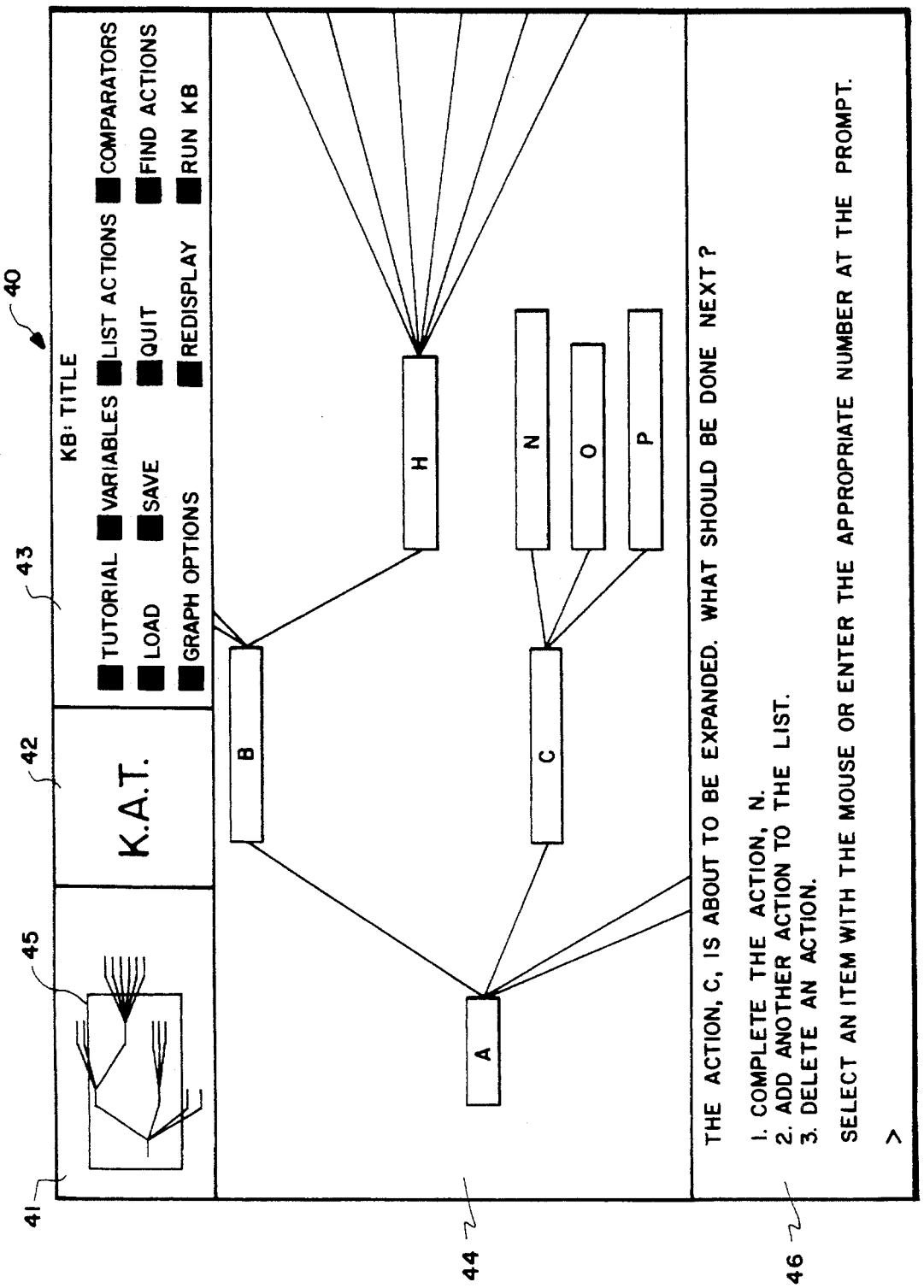
FIG. 4 shows the knowledge acquisition tool display frame which is displayed on the display screen of the tool and provides the main interface between the tool and the expert.

FIG. 4 shows the KAT (or KLAM Shell) frame which the expert sees on the display screen of the knowledge acquisition tool. Frame 40 is comprised of a plurality of windows. Window 41 will show the graph of the entire knowledge base being created by the expert. As can be seen from FIG. 4, the graph is in the form of a horizontal tree which branches from the most general actions or nodes defined by the expert to progressively more particularized subactions. Window 42 may display a logo and/or other markings which identify the knowledge acquisition tool. Window 43 shows some of the options which are available to the expert. For example, the expert can list the created variables, graph the actions, save any of the expert's inputs, find actions, execute the knowledge base being constructed to confirm its accuracy, create variables, see a tutorial which can be similar to an owner's or user's manual, can list the created actions.

Window 44 shows that part of the graph as displayed in window 41 selected by runner 45. Window 44 shows an exploded view of that part of the graph bounded by runner 45 the position of which can be controlled by a mouse or other control device attached to the knowledge acquisition tool. The expert can also use the mouse cursor in window 43 in order to select any of the options available to the expert or in window 46 in order to make any selections offerred there. For example, if the expert selects the option "list actions", all of the nodes or actions which the expert has created will be shown in window 44. If the expert selects the option "graph options" as shown in window 43, then window 44 will present the options in graphical form such as that shown in FIG. 4. As can be seen, these actions/nodes are shown in horizontal fashion rather than vertical fashion. For convenience, however, "hierarchical manner" is used to describe the method used in the present invention of expanding unexpanded actions by pursuing one line of reasoning or branch completely to its end before expanding dependent branches whether a vertical approach or a horizontal approach is taken. Variables can be listed, information saved, variables created, actions found, etc. by selecting the appropriate option as displayed in window 43.

Finally, window 46 shows a window in which the tool provides information to the expert in order to aid him in providing his expert knowledge to the knowledge base and in which he is guided by a series of questions, statements and prompts into making choices or providing knowledge which aids the knowledge acquisition process.

Figure 5:
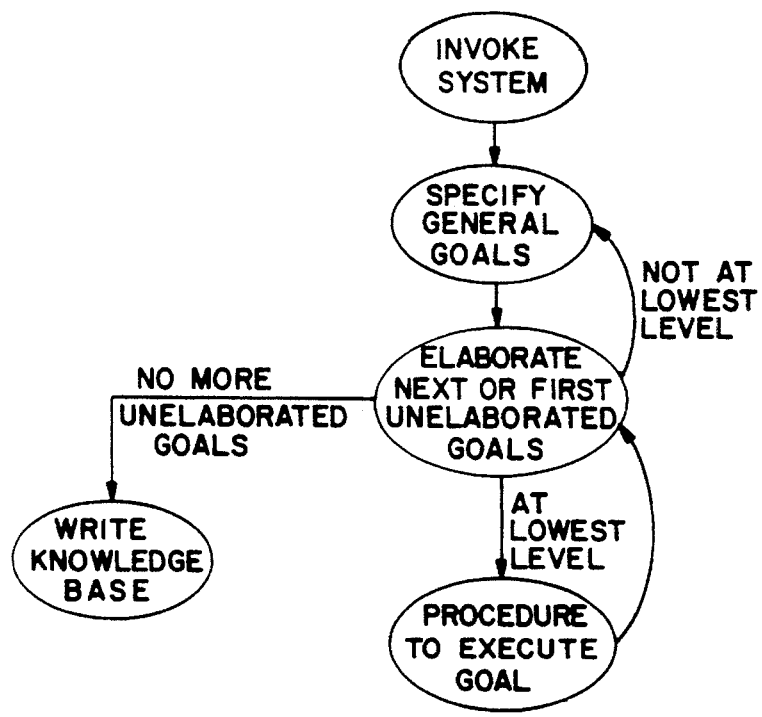
FIG. 5 shows a fundamental functional flow chart of the knowledge acquisition tool.

FIG. 5 shows a functional flow chart of the knowledge acquisition process. When the knowledge aquisition tool is invoked, the tool first directs the expert to specify the general goals (actions). The first unexpanded goal is expanded and a procedure is defined to execute that goal. This process is repeated until all goals, at all levels, are expanded and procedures are defined for them in a hierarchical manner such as the one shown in FIG. 8. When there are no more unexpanded goals, the knowledge base is written.

Figure 6:
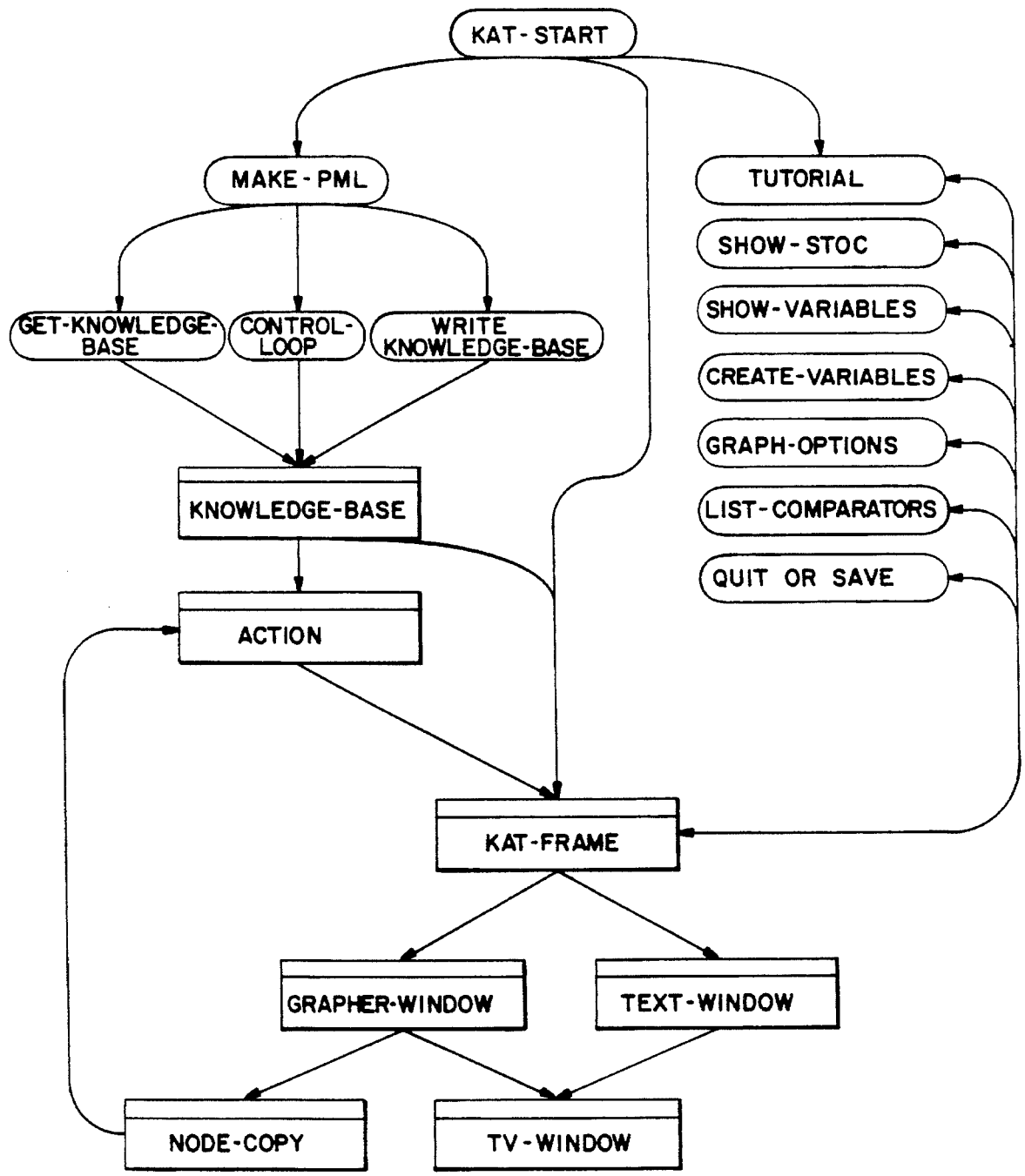
FIGS. 6 and 7 show a module dependency diagram of the knowledge acquisition tool; and, FIG. 8 shows a tree illustrative of the hierarchical expansion of action items by the expert in response to the knowledge acquisition tool.
Figure 7:
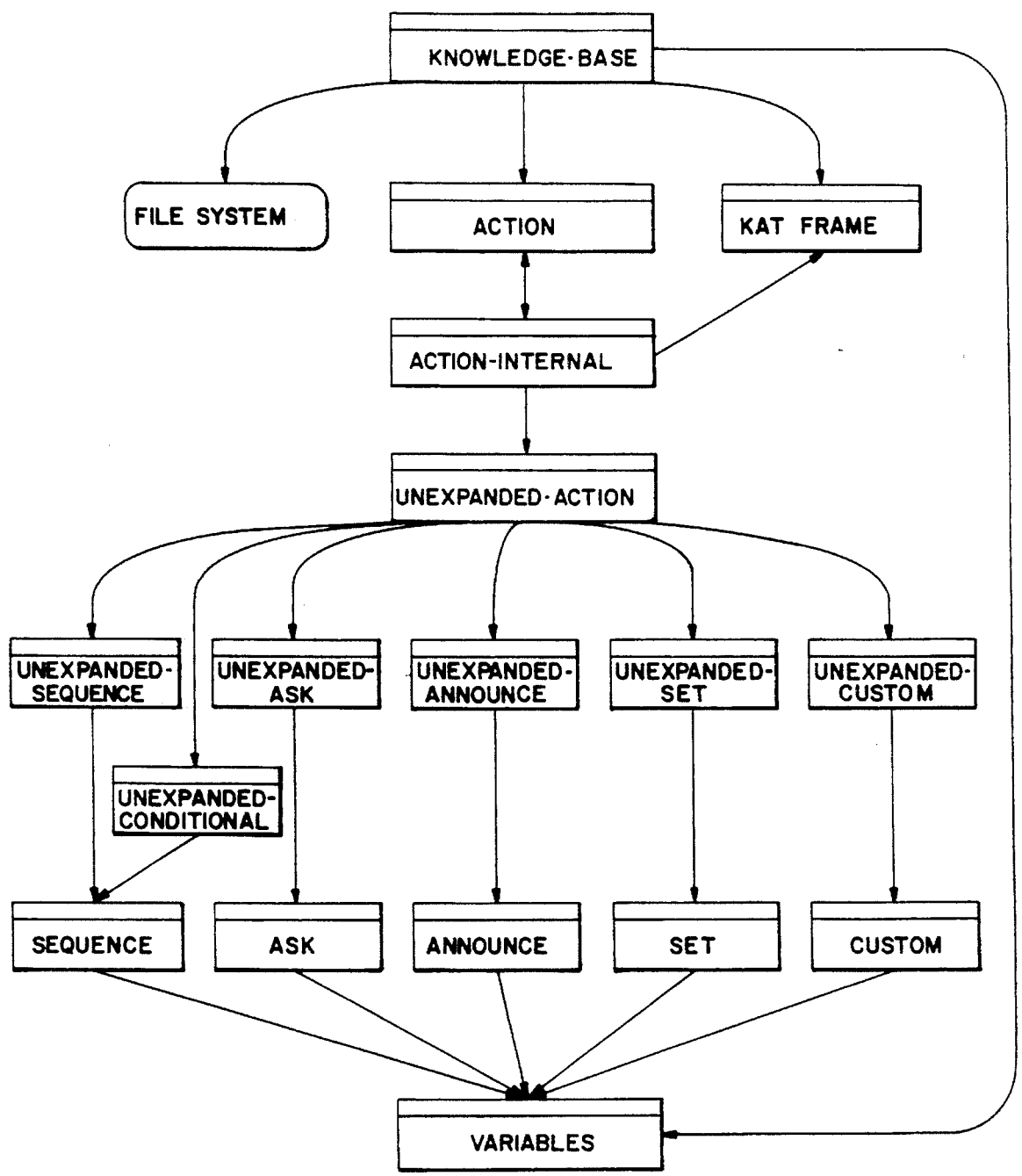

The module dependency diagrams shown in FIGS. 6 and 7 taken together with Appendix A available in the patented file, which is the functional specification at the source level (in LISP) defining the modules and statements useful in making the present invention describe the knowledge acquisition tool and process in more detail. Appendix A also includes definitions of the screens which are presented by the tool to the expert during the knowledge acquisition process.

The diagrams of FIGS. 6 and 7 represent the basic collections of code in the system and show which pieces of code use which other pieces. Code grouped in a function is represented as an oval around the name of the function, and code grouped as methods which operate on data types is represented as a box, with a double top bar, around the name of the data type. Arrows go from the using code to the used code.

The present system can be loaded into any one of the Symbolics computers, such as computer 10 shown in FIG. 1. The knowledge acquisition tool can then be started which causes an instance of the frame, such as that shown in FIG. 4, to be displayed as the system's input/output window. The function KAT-START is called as the acquisition tool's top level function. This function will bind all system global variables definining streams, bind the package variable, bind the knowledge base variable, and set up handlers for system errors. The stream variable should be bound to a background window which is used only when there is an error to report to the user. If an error is caught, the background window will be exposed, a message printed on it which describes what has happened to the user in terms that the user can understand, and the user will be offered a chance to attempt to save the knowledge base. Then, the system will reset its process and start itself over.

Besides setting up these global variables and establishing an error handler, it is KAT-START's job to present the title page, offer the user a chance to see the tutorial, and call the function MAKE-PML.

MAKE-PML is defined in Appendix A, available in the patented file, and has the job of calling GET-KNOWLEDGE-BASE, passing the returned knowledge base object to the function CONTROL-LOOP, and then sending the knowledge base object over to WRITE-KNOWLEDGE-BASE and returning. GET-KNOWLEDGE-BASE queries the user for the name of the new knowledge base or the name of a file containing a saved knowledge base which is to be edited, calls make-instance with this information and returns the created knowledge base. At this point, the user interface screens for both the title page and the GET-KNOWLEDGE-BASE queries can be simple text screens on which text together with a possible logo and one line queries are presented. WRITE-KNOWLEDGE-BASE will ask the user via one line queries about the file name under which to write out the knowledge base.

Upon entry to the CONTROL-LOOP function, the KAT or KLAM frame (the main window instance) is placed into the KAT or KLAM editor configuration and is arranged as shown in FIG. 4. While editing the knowledge base, the expert will always be presented with a frame similar to that shown in FIG. 4. Window 44 shows the detail of the hierarchical graphic display of the network of actions existing in the knowledge base and being edited at the time. The overview window 41 shows a scaled down version of the entire graph with a runner around the portion of the graph currently visible in window 44. The portion of the graph being shown in window 44 may be moved with mouse 13 by clicking on the graph and "pulling" a point to the center of the display, or by clicking on the overview window 41 and positioning the runner over the part of the overview graph to be displayed in more detail. At any time an option may be clicked on in the options window 43. Similarly, any of the action nodes, such as A-P shown in FIG. 4, can be clicked on and several display and editing options for this action will be presented.

All textual interaction with the expert will take place in the expert I/O section which is window 46 shown in FIG. 4.

Depending on the type of interaction which needs to take place, window 46 can be in one of three different basic forms. The simplest form is a text window. This configuration will be used for small menus which fit into the window and for one line expert queries. The second configuration breaks up window 46 into three parts. The first part is a bar at the top of window 46 for displaying a message to the user. The second larger part, which is in the middle of window 46, is a scroll window. The third part at the bottom of window 46 is a small text window for displaying a prompt. This second form will be used for displaying long menus, for showing accumulations of potentially long lists (such as the lists of subactions a user may enter for a sequence) and for other similar situations where a large number of items need to be presented to the expert. The third form breaks window 46 into basically two parts, a top and a bottom part. The top part is a small text window for displaying a message and the bottom part can be used for entering complete text answers. This third form can be used for entering messages for announce actions, and for editing the PML source of custom actions.

As shown in FIG. 6, after picking a knowledge base the expert will interact with the display shown in the KAT frame. The expert will always be presented with a viable editing option in window 46 but a desired action can always be clicked on in the graph for directly editing it. The graph will always show the current state of the knowledge base and any option displayed in window 43 may be used at anytime by simply clicking on it.

The knowledge base, specifically an action within the knowledge base to be expanded (further refined), is shown in the KAT frame. In the main loop of the function CONTROL-LOOP, the function sends to the knowledge base the NEXT-ACTION-TO-EDIT message. This message will cause the knowledge base to return the next unexpanded action to be expanded in the hierarchical manner as defined above.

FIG. 7 expands FIG. 6 in order to show in more detail how an unexpanded action is expanded. Any unexpanded action changes itself into one of several flavors by operation of the expert who is presented with a menu of flavors from which to select. These flavors are unexpanded-sequence, unexpanded-conditional, unexpanded-ask, unexpanded-announce, unexpanded-set, and unexpanded-custom. In expanding an action, the expert is presented with the choice of expanding any action into one of the following flavors: ask, announce, sequence, set, or custom. The ask flavor requires the end user of the expert system to get information and supply it to the system. The announce flavor imparts information to the end user. The sequence flavor generates a list of subactions which the end user is to do. These subactions may be in a sequence or each subaction may be paired with a conditional test. The set flavor requires the end user to set a variable. The custom flavor allows the expert who is creating the knowledge base to define a flavor not otherwise offerred.

There are several options which will abort changes currently being made to an action. They are (1) choosing another action to edit by clicking on it in the graph, (2) choosing to quit, or (3) hitting the abort key to specifically abort current changes. Whenever an action is aborted, control is passed back to the CONTROL-LOOP function via the LISP THROW mechanism. When such an abort takes place, the knowledge base is left at the state it was in immediately before initiation of the current action change or edit.

When an action network has been completed, the knowledge base will return a flag to that effect when sent NEXT-ACTION-TO-EDIT. This will cause the CONTROL-LOOP to print a message asking if the user wishes to finish, giving him or her the chance to click on actions in the graph to edit them. When the user does choose to quit, CONTROL-LOOP will return the knowledge base object, WRITE-KNOWLEDGE-BASE will write it out to a file, and KAT-START will reinvoke itself, starting over again at the beginning title page.

Pages A-26 through A-38 define the various screens displayed in the KAT frame. These screens provide the main interface between the expert whose knowledge is to be extracted by the present knowledge acquisition tool and the tool itself. These screens have been replicated in Appendix B, available in the patent file, which is an example of the screens viewed by the expert during the expert's creation of the expert knowledge base.

The example shown in Appendix B, available in the patented file, is a purely hypothetical example and is included merely for explanatory purposes.

When the system is turned on, the screen shown on page B-1, which is a screen display relevant to the particular system in which the knowledge acquisition tool according to the present invention is used is presented to the expert. As shown on B-2, the expert is asked to log on and the screen display shown in B-3 introduces the user to the identity of the knowledge acquisition tool. This screen also offers the expert user the opportunity to view the tutorial or to directly begin establishing a new knowledge base or editing a knowledge base currently under construction.

Assuming that the editing function is chosen by pressing RETURN, the expert user is presented the screen display shown on page B-4. The action PM-ROOT merely serves as the starting point for the graph which is to be created by the expert, i.e. the root of the tree which will be created. The expert is asked to enter a list of sub-actions for this root action. At this point, the expert will define the most general actions (the highest level categories in the break down of this knowlege). In the example shown, the user types in two actions as shown on page B-5. After entering the last action name, RETURN is pressed and the expert is presented the screen as shown on page B-6. This screen offers the expert the choice of expanding the first action (the first unexpanded action in the tool's hierarchical manner of expansion), adding another action to the list or deleting an action. As shown on page B-7, the expert has selected choice 1, the expansion of the first action. It should be noted that in the hierarchical development of the knowledge base, as described with respect to FIG. 7, the expert is always asked to expand a branch of the tree before expanding any branches depending from it.

Upon selecting choice 1 and selecting the Redisplay option, the expert is presented the screen shown on page B-8. At this point, the system expands the graph as shown in the middle window of the frame and as shown in upper left hand corner of the frame. Here, the expert is asked to define the flavor of the unexpanded action. That is, he will assign the unexpanded action one of the following flavors: unexpanded-ask which is choice 1; unexpanded-announce which is choice 2; unexpanded-sequence which is either choice 3 or choice 4 depending on whether the sequence is a true sequence or where each item in the sequence is paired with a conditional; unexpanded-set which is included as part of choice 5; or, unexpanded-custom which is choice 6. Choice 7 allows the expert to abort this editing function. As shown on page B-8, the expert has used the runner controlled by the mouse to select choice 1. The expert clicks on to choice 1 and is then presented with the screen shown on page B-9 requiring the expert to expand the unexpanded flavor UNEXPAND-ASK. In this case, the expert expands this unexpanded flavor by typing into the scroll window, which is the bottom window of the frame, the question "What kind of food do you want to eat?" which is to be asked of the end user. This question will then be presented to the end user during his or her use of the expert system incorporating the knowledge base which is being created in Appendix B. The purpose of this particular knowledge base is to aid the end user in making such a selection of a restaurant based upon the expert's knowledge. Thus, the question entered by the expert, although it is not viewed by the expert in any of the graphs, will be presented to the end user when he or she is using this knowledge base in order to select a restaurant.

As shown in the screen on page B-10, the expert is then asked to establish a variable name for the responses of the end user to the question "What kind of food do you want to eat?". After the expert presses RETURN, the expert is then required as shown on page B-11 to define the variable as one which is continuous (involving a range), which is discrete (involving one or more distinct variables), or which is a string (involving a set of text characters). As shown on page B-11, the expert has selected item 2 and, upon pressing RETURN, the screen shown in page B-12 is displayed. This screen display is for the information of the expert only. The expert is informed that he or she should enter the items to be displayed to the end user of the knowledge base and that, upon entering the last menu item, the expert should press RETURN in order to continue. Upon pressing any key, the expert is presented with the screen shown on page B-13 and in which he must enter the items to be displayed to the end user. As shown, the items have been entered. Thus, when the end user is presented the question "What kind of food do you want to eat?", the end user will also be presented with a selection of food types to be selected. When the expert has completed describing the variable "food type", the expert presses RETURN and is presented with the screen shown on page B-14.

Having completely expanded the first action branch "SELECT-FOOD-TYPE", the knowledge acquisition tool then guides the expert through expansion of the action "RECOMMEND-A-RESTAURANT". Accordingly, the expert is again presented with three choices, to expand the action "RECOMMEND-A-RESTAURANT", to add another action to the list or to delete an action. As shown, the expert has used the mouse to click on to the first choice and is then presented with the screen shown on page B-15. As indicated, the expert has selected choice 4 from this menu such that the knowledge acquisition tool of the present invention will guide the expert into establishing a list of subactions each of which is paired with a conditional test.

Upon clicking on to item 4, the expert, as shown on page B-16, will be presented with information and then asked to choose whether the conditional test/sub-action pairs are to be generated manually or automatically. The expert has selected automatic generation of conditional tests/sub-action pairs and is presented with the screen display on page B-17. In this case, the knowledge acquisition tool leads the expert through the automatic generation of the conditional pairs by presenting to the user the conditional statements based upon the variables previously established and requiring the expert to define the action if the conditional is true. As shown on page B-18, the expert has entered in the action item which is paired with the first conditional. Each conditional is presented to the expert and he is asked to pair an action item with the conditional. This process is shown on pages B-17 through B-22. Every time the expert presses RETURN, a new conditional is presented to the expert. It should be noted that pages B-17 through B-22 show the same screen display. This screen display is shown in multiple pages to show the process that the expert goes through in establishing the actions for each automatically generated conditional.

When the final condition is presented to the expert and the expert enters the action item in response to this condition and presses RETURN, the expert is presented With the display on page B-23 at which time the expert is led through the expansion of each of the action items which have just been established. Page B-23 shows that the expert has clicked on to the option "redisplay". Page B-24 shows the frame after the "redisplay" function. Following the action "RECOMMEND-A-RESTAURANT", there are three subactions defining the three restaurants to which the end user is directed depending upon what food type he selects. Page B-25 shows that the expert has selected item 1, completing (expanding) the first subaction. The expert is then presented with the menu shown on page B-26 which indicates that the expert has selected item 2, i.e. the announce flavor. Upon pressing RETURN, the expert is then presented the screen on page B-27 which requires the expert to set up the information to be announced to the end user if the end user selects mexican food. Thus, the expert defines the flavor of the action "GO-TO-EL TORITOS". As shown in the remaining pages B-28 through B-33, the expert is likewise led through the defining of the flavors for the other subactions.

As shown on page B-34, the knowledge acquisition tool informs the expert that there are no more unexpanded actions in the knowledge base and asks the expert to use the mouse in order to click on an option if the expert wishes to keep editing. As shown on page B-37, the expert chooses to save the knowledge base and is queried concerning the selection of this option (on page B-38) to make certain that he or she wishes to save the knowledge base. The expert responds in the affirmative. Pages B-38 and B-39 relate to writing the knowledge base and pages B-40 and B-41 relate to logout.

As can be seen, the knowledge acquisition tool of the present invention automatically interviews a domain expert, that is an expert whose knowledge is to be extracted and is to be used by an end user in the performance of a function at the expert's level of expertise. The tool leads the expert through the creation of a knowledge base which incorporates the expert's knowledge in the form of actions and subactions to be performed by an end user based upon observances that are made by the end user which form the end user's input to an expert system.

The embodiments of the invention in which an exclusive property or right is claimed are defined as follows:

1. A method for eliciting procedural knowledge from an expert for constructing an expert system said method being executable on a computer having an associated display device which results in the generation and display, in order, to the expert of a representation of an organized procedural information structure having properly ordered nodes, each of said nodes defining a goal, each said goal a parent goal to either a set of daughter goals which when completed effectuate said parent goal, or alternatively, a set of procedures for effectuating said parent goal, wherein each said procedure consists of instructions and questions to be put to said users in order to lead said user to achieve said goals, said method comprising the following steps wherein the requesting of said knowledge from said experts and his responses thereto are via said display device:

A. requesting said expert to generally categorize said procedural knowledge to define a current reference goal which is initially a root goal which a user would want to achieve;

B. requesting said expert to specify in a preferred order all goals which are daughters of the current reference goal, said daughter goals to be achieved before achieving their parent thereof, i.e., the current reference goal, which preferred order will determine the order to which said user may be displayed any of said goals or nodes, and also requesting said expert to specify the conditional relationships, if any, between any daughter goals and the current reference goal, each of said conditional relationships determining whether particular procedures will be displayed to the user, and each of said conditional relationships being designated by the expert as relative to information already made available to the expert system by said expert or by a user in response to procedures at run time, and in the absence of any said daughter goals proceeding to step D;

C. designating on said display means and in accordance with said preferred order the new current reference goal and returning to step B;

D. requesting said expert to specify procedures and to complete said current reference goal;

E. designating on said display means the parent goal of said current reference goal as the current reference goal and, if there is at least a remaining one of said goals branching therefrom, then designating the next one of said remaining one of said goals in accordance with said preferred order as the current reference goal and returning to step B;

F. stopping if said current reference goal is said root goal but otherwise returning to step E.

2. A method according to claim 1 wherein in step E said expert is first given the options of adding a descendent goal to said parent goal or removing a descendent goal from said parent goal.

3. A method according to claim 1 wherein in said step D involves giving or getting information to or from the end user in a predetermined order as specified in said step B thereof.

4. A method as set forth in claim 1 wherein in Step D said expert may specify the conditional relationship, if any, between the current reference goal and its parent, and the conditional relationship, if any, between the procedures and any goal.

5. A digital computer system operable as an expert system which employs a procedural node information structure having a set of nodes hierarchically arranged and conditionally dependent such that display to a user exposes to the user each procedure required for the attainment of the user's goal, but only in an allowable order as specified in the construction of said structure, constructed by the process of eliciting procedural knowledge from an expert for constructing an expert system said method being executable on a computer having an associated display device which results in the generation and display, in order, to the expert of a representation of an organized procedural information structure having properly ordered nodes, each of said nodes defining a goal, each said goal a parent goal to either a set of daughter goals which when completed effectuate said parent goal or alternatively, a set of procedures for effectuating said parent goal, wherein each said procedure consists of instructions and questions to be put to said users in order to lead said user to achieve said goals, said method comprising the following steps wherein the requesting of said knowledge from said experts and his responses thereto are via said display device:

A. requesting said expert to generally categorize said procedural knowledge to define a current reference goal which is initially a root goal which a user would want to achieve;

B. requesting said expert to specify in a preferred order all goals which are daughters of the current reference goal, said daughter goals to be achieved before achieving their parent thereof, i.e., the current reference goal, which preferred order will determine the order to which said user may be displayed any of said goals or nodes, and also requesting said expert to specify the conditional relationships, if any, between any daughter goals and the current reference goal, each of said conditional relationships determining whether particular procedures will be displayed to the user, and each of said conditional relationships being designated by the expert as relative to information already made available to the expert system by said expert or by a user in response to procedures at run time, and in the absence of any said daughter goals proceeding to step D;

C. designating on said display means and in accordance with said preferred order the new current reference goal and returning to step B;

D. requesting said expert to specify procedures and to complete said current reference goal;

E. designating on said display means the parent goal of said current reference goal as the current reference goal and, if there is at least a remaining one of said goals branching therefrom, then designating the next one of said remaining one of said goals in accordance with said preferred order as the current reference goal and returning to step B;

F. stopping if said current reference goal is said root goal but otherwise returning to step E.

* * * * *